United States Patent Office 3,092,092
Patented June 4, 1963

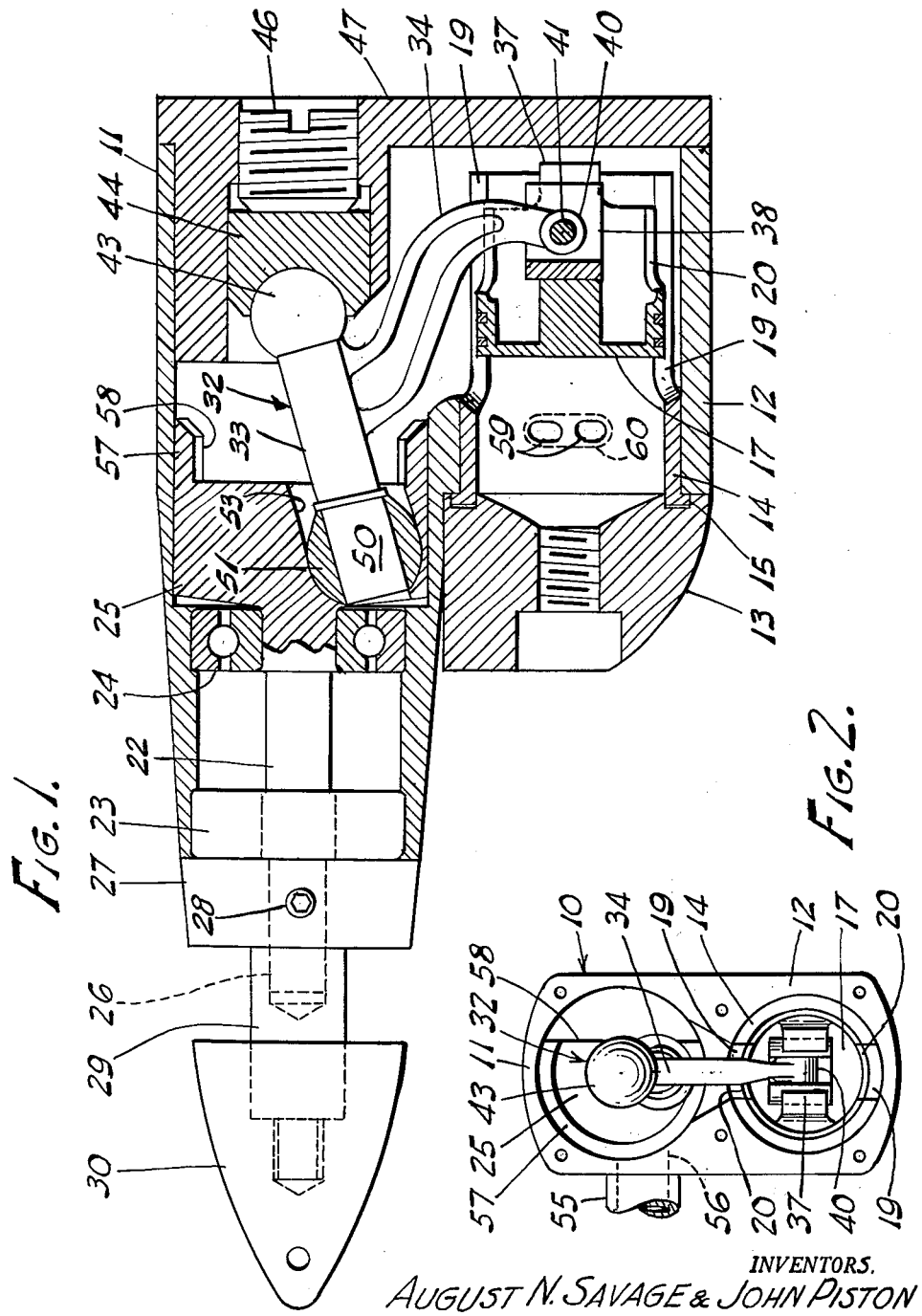

3,092,092
INTERNAL COMBUSTION ENGINE
August N. Savage, 696 Crescent Ave., Buffalo, N.Y., and John Piston, 435 Ashford Ave., Tonawanda, N.Y.
Filed Oct. 27, 1959, Ser. No. 848,970
4 Claims. (Cl. 123—197)

This invention relates to internal combustion engines and more particularly to novel means for translating the piston thrust of internal combustion engines to rotary motion of an output shaft.

The novel internal combustion engine operating principles and construction of the present invention are particularly applicable in the field of miniature internal combustion engines of the type employed in powering model aircraft, although the teachings of the invention may be employed in constructing engines of any scale or size where the benefits appear to be available.

The motion translating means which particularly characterizes the present invention eliminates the conventional connecting rod and crankshaft arrangement which is usually employed in converting the piston thrust to rotary movement and provides motion translating means which is lower in friction, has less bearing areas, and much lower bearing surface speeds, particularly as regards the bearing surfaces which are subjected to the higher bearing pressures.

One type of internal combustion engine which has been the subject of much prior experimentation and invention is the swash plate or wobble plate engine which likewise aims at the elimination of the usual conventional type of crankshaft but such engines involve swash plate bearings and camming surfaces which are subject to substantially the same or greater objections and operating problems as conventional crankshaft and connecting rod bearings and as a consequence, despite their experimental antiquity, engines of the swash plate or wobble plate type have achieved practically no practical success or commercial acceptance.

The engine of the present invention may be said to bear a slight resemblance in theory of operation to the swash plate engine to the extent that the final transmission of the driving impulse is imparted to the output shaft by means moving on a gyratory or nutating axis.

However, the manner in which the mechanical components cooperate to produce this translatory motion is novel to the present invention, as will appear from a study of the specific embodiment of the principles of the invention which is illustrated in the drawings and described in detail in the following specification. In the present power transmission and conversion arrangement the axis of the final transmission member moves in a conical path, the axis of the cone being coincident with the output shaft axis and the vertex of the cone comprising an abutment center.

The invention is not limited in its application to the precise form shown in the drawing and described herein by way of example and various modifications may be made without departing from the principles of the invention, the scope of which is limited only as defined in the appended claims.

In the drawing:

FIG. 1 is a general longitudinal cross sectional view through one form of the internal combustion engine of the present invention; and FIG. 2 is an end elevational view taken from the left end of the structure illustrated in FIG. 1 and with the end cover member thereof removed.

In the drawing the exemplary embodiment is illustrated in the position or attitude in which it will normally assume when it is employed as a power plant for model aircraft, although of course the engine is susceptible of use in other positions and environments and for other purposes. In the drawing, like characters of reference denote like parts and the numeral 10 designates generally a main casing member which comprises a pair of superposed integrally formed cylinders 11 and 12.

The left end of lower cylinder 12 is closed by a cylinder head 13 which cooperates with a sleeve 14 to form a combustion chamber. Sleeve 14 has a flange 15 at the cylinder head end thereof which is held between cylinder 12 and cylinder head 13 as shown in FIG. 1, the latter being attached to the cylinder by screws, not shown.

A piston 17 is slidable in sleeve 14 and is more or less conventional in form excepting for the portion which delivers the thrust thereof, which portion will be more fully described later herein. Both the sleeve 14 and the skirt portion of the piston 17 have diametrically opposite longitudinal slots as indicated at 19 and 20, respectively, in FIG. 1. The slot 19 of sleeve 14 is for the purpose of admitting gaseous fuel mixture to the combustion chamber from the general space beneath the piston when the piston is in the position shown in FIG. 1 in which the combustion chamber is expanded, in a manner which has previously been employed in two cycle engines of this general type.

The portion of casing 10 which forms the cylinder 11 comprises the support for the output or driven shaft of the engine which, in the present instance, comprises the propeller shaft of a model aircraft engine. The shaft is designated 22 and is supported by means of a pair of anti-friction ball bearings 23 and 24. The inner end portion of shaft 22 has a generally cylindrical enlargement 25 which fits within a cylindrical bore in the portion 11 of casing 10.

The outer end of shaft 22 is reduced as at 26 and engages within a collar 27, the latter being detachably secured thereto by a set screw 28. Collar 27 has a reduced forward extension 29 for receiving the usual propeller (not shown) and a nose piece or spinner 30 is threaded onto the front end of extension 29 for retaining a propeller thereon.

Reference will now be had to the novel means provided for transmitting the reciprocating thrust of piston 17 to the rotary enlargement 25 of shaft 22 for continuous rotation of the shaft. A rocker member designated generally by the numeral 32 comprises a spindle portion 33 and a laterally extending arm portion 34. The outer end of arm portion 34 has operative connection with piston 17 in a manner which will now be described.

Piston 17 is provided with a central bifurcated bearing formation 37 which receives a cylindrical bearing block 38, the latter being slidable therein in a direction at right angles to the axis of the piston and in the common plane of the axes of the cylinders 11 and 12. Bearing block 38 is also bifurcated to receive a bearing formation 40 which is provided at the outer end of the arm portion 34 of rocker member 32. A pivot pin 41 extends through bearing formation 40 and the walls of bearing block 38.

At its outer end the spindle portion 33 of rocker member 32 is provided with a spherical formation 43 which seats in a spherical seat in an Oilite bearing block 44. The bearing block 44 and its spherical seat are coaxial with shaft 22 and accordingly the center of spherical formation 43 of the spindle portion 33 of rocker member 32 has a fixed center along the axis of shaft 22. This center, while fixed, is adjustable along the shaft axis by means of an adjusting abutment screw 46 which is likewise coaxial with shaft 22 and which screws into a cover member 47 which is secured to the right hand end of casing 10, as viewed in FIG. 1, by means of screws.

The end of spindle 33 opposite to the spherical formation 43 comprises a journal formation 50 which bears rotatably in a generally spherical bearing member 51. Bearing member 51 is pressed into a bore 53 in the enlargement 25 of shaft 22, bore 53 extending in an oblique direction generally coaxial with spindle 33. The spherical formation of bearing member 51 is provided merely to render the bearing for journal formation 50 self-aligning in the enlargement 25.

It is believed to be clear from the foregoing that, as the piston 17 reciprocates in cylinder 12 and the rocker member 32 accordingly oscillates about spherical bearing 43, 44, the spindle 33 is constrained to rotate in a circular or conical path and thus produce rotation of shaft 22 by engagement of journal formation 50 in the bearing 51 of shaft enlargement 25. Bearing block 38 slides laterally as described above to permit the necessary lateral displacement of pivot pin 41 as arm portion 34 swings about the fixed center of spherical formation 43.

The foregoing is found to provide an extremely efficient and effective mode of translating the piston thrust to rotation of shaft 22. The principal reactive forces of the motion translating movements of the parts are exerted by spherical formation 43 against abutment member 44, the spherical bearing serving to receive and effectively dissipate the thrust forces, despite the constantly varying direction of such forces, and in bearing means requiring a minimum bearing area for efficient and effective operation and also involving relatively low bearing surface speeds.

An intake conduit for gaseous fuel mixture is indicated at 55 in FIG. 2 and a passage 56 therefrom opens into the chamber containing the enlargement 25 of shaft 22. Enlargement 25 has a skirt portion 57 which registers with passage 56 to overlie and close the same excepting when, in the rotation of shaft 22, a cutaway portion of skirt 57, indicated at 58 in FIG. 2, permits ingress of fuel mixture for a predetermined part of each rotation of shaft 22. Fuel mixture thus admitted to the space housing the rocker member 32 passes to the combustion chamber through the slots 19 of cylinder sleeve 14 as aforesaid.

Sleeve 14 of cylinder 12 is provided with exhaust passages 59 which register with exhaust passages 60 extending through the casing wall. The operation of the two stroke cycle of the engine involving the foregoing passages will not be described in further detail since such operation is generally conventional and known to those skilled in this art.

We claim:

1. In an internal combustion engine, casing means including a cylinder, a piston reciprocable therein and cooperating therewith to define a combustion chamber, an output shaft rotatably disposed adjacent to said cylinder and parallel to the axis thereof, a rocker member extending transversely between said piston and said shaft, said rocker member having one end portion thereof comprising a journal engaging rotatably in a bearing opening in the end of said shaft obliquely and eccentrically to the shaft axis, the axis of said journal being inclined to intersect the axis of said shaft at a point spaced axially from said journal, said rocker member having a spherical end formation concentric with said axis intersection, said casing means having a spherical bearing seat coaxial with said shaft bearing against the spherical end formation of said rocker member to retain said journal in engagement with the end of said shaft, a member carried and guided by said piston for lineal sliding movement transverse to the piston axis and in the common plane of the piston and shaft axes, and a pivot connection comprising a pin through the other end of said rocker member and said piston carried slidable member, said pivot connection axis being at right angles to said common plane of the shaft axes.

2. In an internal combustion engine, casing means including a cylinder, a piston reciprocable therein and cooperating therewith to define a combustion chamber, an output shaft rotatably disposed adjacent to said cylinder and parallel to the axis thereof, a rocker member extending transversely between said piston and said shaft, said rocker member having one end portion thereof comprising a journal engaging rotatably in the end of said shaft obliquely and eccentrically to the shaft axis, the axis of said shaft journal being inclined to intersect the axis of said shaft at a point spaced axially from said journal, said rocker member having a spherical end formation concentric with said axis intersection, said casing means having a spherical bearing seat coaxial with said shaft bearing against the spherical end formation of said rocker member to retain said journal in engagement with the end of said shaft, means for adjusting said bearing seat axially with respect to said shaft, a member carried and guided by said piston for lineal sliding movement transverse to the piston axis and in the common plane of the piston and shaft axes, and a pivot connection comprising a pin through the other end of said rocker member and said piston carried slidable member, said pivot connection axis being at right angles to said common plane of the shaft axes.

3. In a piston and cylinder motion translation mechanism, casing means having an open end and a pair of adjacent parallel substantially cylindrical chamber portions leading inwardly from said end of said casing, a detachable cover member for said end of said casing adapted to jointly close both of said cylindrical chamber portions, a shaft journaled in said casing at the end thereof opposite to said cover member and coaxial with one of said cylindrical chamber portions, said shaft having an enlargement at one end thereof directed toward said open end of the casing, a piston in the other of said cylindrical chamber portions with its skirt directed toward said open end of the casing, said shaft enlargement having an eccentrically located spheroidal seat directed toward said cover member, an externally spheroidal self-aligning bearing member in said seat, said cover member having a spheroidal seat coaxial with said shaft and directed toward said enlargement, a motion transmitting member comprising a strut having a spheroidal end portion disposed in said spheroidal seat, a journal portion having rotatable bearing in said bearing member, and an arm projecting laterally therefrom, a slide member pivoted to the outer end of said arm at right angles to the plane of the axes of said cylinder chamber portions, and means on said piston guiding said slide member for movement in a line lying in said plane and transverse to said axes.

4. In a piston and cylinder motion translation mechanism, casing means having an open end and a pair of adjacent parallel substantially cylindrical chamber portions leading inwardly from said end of said casing, a detachable cover member for said end of said casing adapted to jointly close both of said cylindrical chamber portions, a shaft journaled in said casing at the end thereof opposite to said cover member and coaxial with one of said cylindrical chamber portions, said shaft having an enlargement at one end thereof directed toward said open end of the casing, a piston in the other of said cylindrical chamber portions with its skirt directed toward said open end of the casing, said shaft enlargement having an eccentrically located spheroidal seat directed toward said cover member, an externally spheroidal self-aligning bearing member in said seat, said cover member having a spheroidal seat member coaxial with said shaft and directed toward said enlargement, means for adjusting said spheroidal seat member in an axial direction, a motion transmitting member comprising a strut having a spheroidal end portion disposed in said spheroidal seat, a journal portion having rotatable bearing in said bearing member, and an arm projecting laterally therefrom, a slide member pivoted to the outer end of said arm at right angles to the plane of the axes of said cylinder member portions, and means on said piston guiding said slide member for movement in a line lying in said plane and transverse to said axes.

References Cited in the file of this patent

UNITED STATES PATENTS

| | | |
|---|---|---|
| Re. 15,442 | Almen | Sept. 5, 1922 |
| 821,546 | Smallbone | May 22, 1906 |
| 1,210,649 | Holley et al. | Jan. 2, 1917 |
| 2,455,626 | Traut | Dec. 7, 1948 |
| 2,551,025 | Lindeman | May 1, 1951 |

FOREIGN PATENTS

| | | |
|---|---|---|
| 27,793 | Great Britain | Dec. 18, 1903 |
| 561,921 | Great Britain | June 9, 1944 |
| 493,512 | Italy | Apr. 27, 1954 |